(12) United States Patent
Wahl et al.

(10) Patent No.: US 8,617,018 B2
(45) Date of Patent: Dec. 31, 2013

(54) TRANSMISSION FOR OPERATING AN AUXILIARY ASSEMBLY

(71) Applicant: Schaeffler Technologies AG & Co. KG, Herzogenaurach (DE)

(72) Inventors: Peter Wahl, Karlsruhe (DE); Thorsten Krause, Buehl (DE); Stefan Jung, Kehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/694,180

(22) Filed: Nov. 2, 2012

(65) Prior Publication Data
US 2013/0116079 A1    May 9, 2013

(30) Foreign Application Priority Data
Nov. 2, 2011 (DE) .......................... 10 2011 085 630

(51) Int. Cl.
*F16H 3/72* (2006.01)
*F16H 3/68* (2006.01)

(52) U.S. Cl.
USPC .................................. 475/5; 475/8; 475/297

(58) Field of Classification Search
USPC .................................................. 475/5, 8, 297
See application file for complete search history.

(56) References Cited

U.S. PATENT DOCUMENTS

| | | | |
|---|---|---|---|
| 6,863,140 B2 * | 3/2005 | Noreikat et al. | 180/65.23 |
| 2005/0130782 A1 * | 6/2005 | Vollrath | 475/5 |
| 2008/0194369 A1 * | 8/2008 | Boutou et al. | 475/5 |

* cited by examiner

*Primary Examiner* — Edwin A Young
(74) *Attorney, Agent, or Firm* — Lucas & Mercanti, LLP

(57) ABSTRACT

A transmission for operating an auxiliary assembly in a drivetrain of a hybrid vehicle, includes a first sun gear rotatable about a main axis on a drive input side of the transmission, a first planet gear in engagement with the first sun gear on the drive input side of the transmission, a second planet gear on a drive output side of the transmission and mounted with the first planet gear on a common shaft, and a second sun gear in engagement with the second planet gear on the drive output side of the transmission, for coupling to the auxiliary assembly. The first planet gear is connected to the shaft by a first freewheel, which generates a rotationally conjoint connection when the first planet gear overruns in a first direction of rotation, and generates a freewheeling connection when the first planet gear overruns in a second, opposite direction of rotation. The shaft is mounted in a second freewheel in a planet carrier, which second freewheel permits a rotation of the shaft when the shaft rotates about its axis in the first direction of rotation and blocks a rotation of the shaft in the second, opposite direction of rotation.

14 Claims, 4 Drawing Sheets

Fig. 6

TRANSMISSION FOR OPERATING AN AUXILIARY ASSEMBLY

BACKGROUND OF THE INVENTION

1. Field of the Invention

The invention relates to a transmission for operating an auxiliary assembly, such as for example an oil pump or a transmission oil pump, in a drivetrain of a vehicle, in particular of a hybrid vehicle.

2. Description of Prior Art

In known hybrid drivetrains, the torque of the internal combustion engine is conducted via a rotary vibration damper (usually in the form of a dual mass flywheel (ZMS)) to a wet or dry starting clutch, the output part of which is connected to an electric drive (electric machine) such that via a second rotary vibration damper (for example a classic compression-spring or bow-spring damper), both the internal combustion engine torque and also the electric machine torque can be introduced into a downstream transmission (stepped automatic transmission/CVT/dual clutch transmission).

To control the starting clutch and the automatic transmission and to lubricate all of the transmission components, an oil pressure is usually required in the system, which oil pressure is generated by a mechanically driven hydraulic oil pump. The drive of such a transmission oil pump, which is usually arranged radially at the outside in the transmission, is generally realized by a chain drive, the drive-input-side sprocket of which is arranged coaxially with respect to the transmission input shaft. In the case of known torque converter automatic transmissions, the sprocket is driven by the converter casing (the pump neck) and a spline toothing, and thus at the engine speed. The drive via a component arranged radially outside the second rotary vibration damper however firstly restricts the installation space for the second rotary vibration damper radially and axially, and secondly has an adverse effect on weight and mass moment of inertia.

SUMMARY OF THE INVENTION

It is an object of the invention to design an improved drivetrain by means of which an auxiliary assembly such as a transmission oil pump can be operated without significantly increasing additional radial installation space outside a rotary vibration damper. In particular, it is a further object of the invention to ensure the drive of an auxiliary assembly such as a mechanical oil pump drive in different operating states of a hybrid drivetrain.

According to an embodiment of the invention, a transmission for operating an auxiliary assembly in a drivetrain of a vehicle, in particular of a hybrid vehicle, includes a first sun gear rotatable about a main axis on a drive input side of the transmission, a first planet gear in engagement with the first sun gear on the drive input side of the transmission, a second planet gear on a drive output side of the transmission and mounted with the first planet gear on a common shaft, and a second sun gear in engagement with the second planet gear on the drive output side of the transmission, for coupling to the auxiliary assembly. The first planet gear is connected to the shaft via a first freewheel, which first freewheel generates a rotationally conjoint connection between the first planet gear and the shaft when the first planet gear overruns in a first direction of rotation about its axis, and which first freewheel generates a freewheeling connection between the planet gear and the shaft when the first planet gear overruns in a second, opposite direction of rotation. The second planet gear is connected to the shaft rotationally conjointly in both directions of rotation, and wherein the shaft is mounted in a second freewheel in a planet carrier, which second freewheel permits a rotation of the shaft when the shaft rotates about its axis in the first direction of rotation and blocks a rotation of the shaft in the second, opposite direction of rotation.

In a preferred embodiment of the invention, the common shaft on which the first and second planet gears are mounted is mounted in a planet carrier which is rotatable about the main axis. The common shaft (that is to say the planet shaft) is preferably mounted in a rotary bearing, such as for example a needle-roller bearing, in the planet carrier, and is particularly preferably arranged in a sleeve or elongate bushing. In a vehicle, such as a hybrid vehicle, having two (or more) different drives, the transmission according to the invention may then permit, through interaction of the freewheels with the planet shaft and the planet carrier, a range of drive-transmitting paths between the first and second sun gears, which in turn ensures the mechanical drive of the auxiliary assembly in the diverse operating states of the vehicle. For example, the transmission according to the invention may be used to ensure the oil feed in the traction gearbox in as far as possible all operating states of the vehicle. In this connection, the planet carrier is preferably designed for rotationally conjoint connection to an output part of a starting clutch, in particular to a rotor of an electric machine in the drivetrain of the vehicle. Similarly, the first sun gear may be designed for rotationally conjoint connection to an input part of a starting clutch, in particular to a crankshaft of an internal combustion engine in the drivetrain. Regardless of whether the electric machine or the internal combustion engine, or both together, are responsible for the drive of the vehicle, the planetary gear set according to the invention can transmit the drive to the second sun gear and thus to the auxiliary assembly.

In a preferred embodiment of the invention, the common shaft on which the first and second planet gears are mounted extends substantially parallel to the main axis of rotation. A transmission ratio $i_0$ of the transmission from the first sun gear to the second sun gear is preferably equal to 1 (that is to say $i_0=1$). Some other transmission ratio (that is to say $i_0 \neq 1$) is however also possible with the transmission according to the invention. The second sun gear is preferably mounted so as to rotate about an axis which is collinear with the main axis, such that the first and second sun gears and also the planet carrier are all rotatable about the one main axis.

In a preferred embodiment of the invention, the transmission has a plurality of first planet gears in engagement with the first sun gear, and in particular uniformly distributed about the circumference thereof, on the drive input side of the transmission, and a plurality of second planet gears in engagement with the second sun gear, and in particular uniformly distributed about the circumference thereof, on the drive output side of the transmission, wherein in each case one first planet gear and in each case one second planet gear are mounted on in each case one common shaft. In other words, the first and second planet gears are mounted in a paired fashion on in each case one common shaft. This means that each first planet gear is connected to the respective shaft by means of a first freewheel, which freewheel generates a blocked, rotationally conjoint connection when the first planet gear overruns in a first direction of rotation, and which freewheel generates a freewheeling connection when the first planet gear overruns in a second, opposite direction of rotation. Furthermore, each second planet gear is connected to the respective shaft rotationally conjointly in both directions of rotation, and each shaft in the planet carrier is mounted in a second freewheel which permits a rotation of the shaft when the shaft rotates about its axis in the first direction of rotation and which blocks a rotation of the shaft in the second, opposite direction of rotation. The transmission according to the invention preferably has at least two first and two second planet gears, distributed uniformly about the circumference of the sun gears, in order to counteract or eliminate imbalance in the arrangement. In this embodiment, the planet carrier in which all of the planet shafts are mounted is arranged so as to be rotatable about the main axis.

With the transmission according to the invention, it must be noted that the first sun gear can be replaced by a first internal gear and/or that the second sun gear can be replaced by a second internal gear. That is to say, in a preferred embodiment, the transmission according to the invention may have a first internal gear instead of the first sun gear and/or a second internal gear instead of the second sun gear, while the other features of the transmission remain unchanged.

As already indicated above, the invention is used preferably in a drivetrain of hybrid vehicles having an internal combustion engine, an electric drive (electric machine) and a wet or dry starting clutch. In this connection, the invention preferably provides a powertrain having a rotary vibration damper for vibration isolation in the drivetrain of the hybrid vehicle, that is to say by means of which rotary vibrations in the drivetrain can be damped or entirely or partially absorbed. The rotary vibration damper, also referred to as torsional vibration damper, may take various forms, but is typically in the form of a dual mass flywheel (ZMS) and may be a compression-spring or bow-spring damper. For this purpose, a simple planetary gear set (for example without internal gear) may be proposed whose planet axes are arranged at the same effective radius as, or at a similar effective radius to, the springs of the rotary vibration damper or of the dual mass flywheel (ZMS).

According to another embodiment of the invention, therefore, a powertrain is provided for operating an auxiliary assembly in a drivetrain of a vehicle, in particular of a hybrid vehicle, having a transmission which may be embodied and refined as described above, and having a rotary vibration damper. The rotary vibration damper has a primary mass which is rotatable about the main axis of rotation, a secondary mass which is rotatable in the circumferential direction relative to the primary mass about the main axis of rotation, and an energy store device by means of which the secondary mass is coupled to the primary mass in such a way that relative rotation is permitted to a limited extent. Each planet shaft extends, preferably substantially parallel to the main axis of rotation, through a through-drive opening in the rotary vibration damper from the primary mass to the secondary mass. In this configuration, at least one of the freewheels, typically the second freewheel, may be arranged so as to partially overlap the rotary vibration damper or the dual mass flywheel (ZMS) in the (main) axial direction. The incorporation or installation of the planetary gear set according to the invention in a dual mass flywheel (ZMS) creates a very compact, space-saving unit which takes up little space (if any) in the radial direction outside the rotary vibration damper.

In a preferred embodiment, the through-drive opening in the rotary vibration damper is designed so as to permit a maximum relative rotation of the secondary mass with respect to the primary mass about the main axis of rotation, without a planet shaft abutting against an edge or against a circumference of the through-drive opening. The first sun gear is preferably rotationally conjointly connected to the primary mass.

In a preferred embodiment of the invention, the energy store device has at least one spring, wherein each planet shaft is arranged at the same effective radius as, or at a similar effective radius to, the at least one spring of the rotary vibration damper.

Depending on the distribution of the planetary gear set and distribution of the rotary vibration damper, different arrangements of the spring with respect to the planet axes about the circumference are conceivable. As mentioned above, the planetary gear set according to the invention preferably has at least two first and two second planet gears in order to counteract or eliminate imbalance in the arrangement. In the case of conventional compression-spring dampers with 6-spring distribution, it is for example conceivable for two spring windows which are situated 180° opposite one another to be removed and for the corresponding planet axes to be arranged in said region, such that a 4/2 distribution of dampers/planets would be realized. Numerous further distributions or combinations (for example 3/3, 2/2, 2/4 etc.) are conceivable.

The invention thus provides a powertrain in which a planetary gear set according to the invention is integrated with a rotary vibration damper in such a way that each planet shaft of the transmission extends, preferably substantially parallel to the main axis of rotation of the damper, through a through-drive opening in the rotary vibration damper. As a result of the arrangement of the two freewheels on the planet shaft in said through-drive, the mechanical drive of an auxiliary assembly, for example of a transmission oil pump, is permitted at diverse operating points. It is thus possible here for the drive of the oil pump to be ensured by a planet drive, situated preferably radially at the inside, through the rotary vibration damper.

According to a further embodiment of the invention, a drivetrain of a vehicle, in particular of a hybrid vehicle, includes an internal combustion engine, an electric machine and a starting clutch, having a transmission which may be embodied and refined as described above, or having a powertrain which may be embodied and refined as described above, for operating an auxiliary assembly in the drivetrain, wherein the first sun gear is rotationally conjointly connected to an input part of the starting clutch, in particular to a crankshaft of the internal combustion engine, and wherein each planet shaft is mounted in a planet carrier which is rotatable about the main axis and which is rotationally conjointly connected to an output part of the starting clutch, in particular to a rotor of an electric machine.

BRIEF DESCRIPTION OF THE DRAWINGS

The invention will be explained by way of example below with reference to the appended drawings and on the basis of preferred exemplary embodiments, wherein the features illustrated below may constitute an aspect of the invention both individually and also in combination. In the drawings:

FIG. 6 is a table of the different operating states of a hybrid vehicle provided with the drivetrain according to the invention, and the respective state of the parts of the drivetrain.

DETAILED DESCRIPTION OF THE PREFERRED EMBODIMENTS

Figure 1:
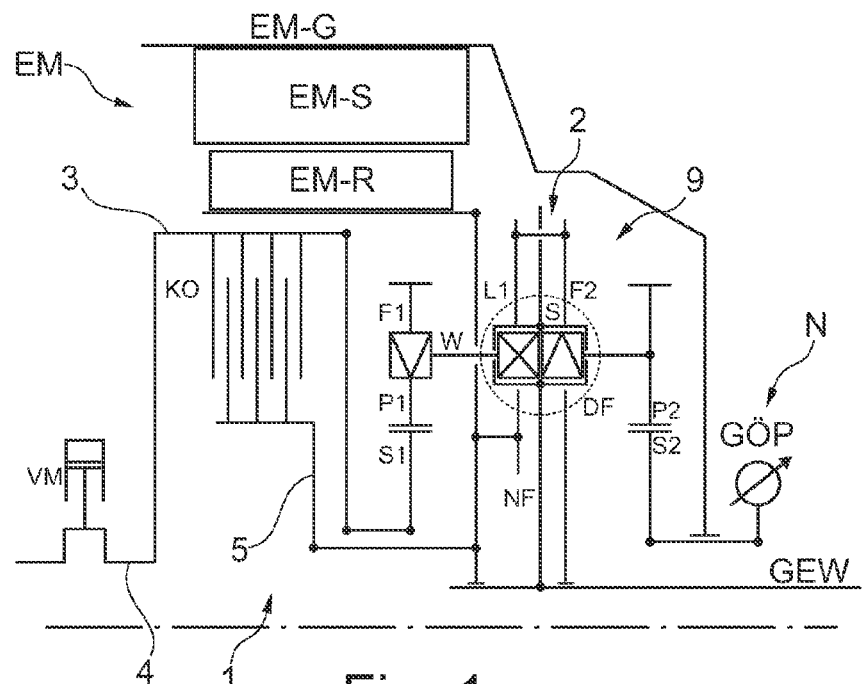
FIG. 1 is a schematic diagram of an upper half of a drivetrain according to an embodiment of the invention in a hybrid vehicle.
Figure 2:
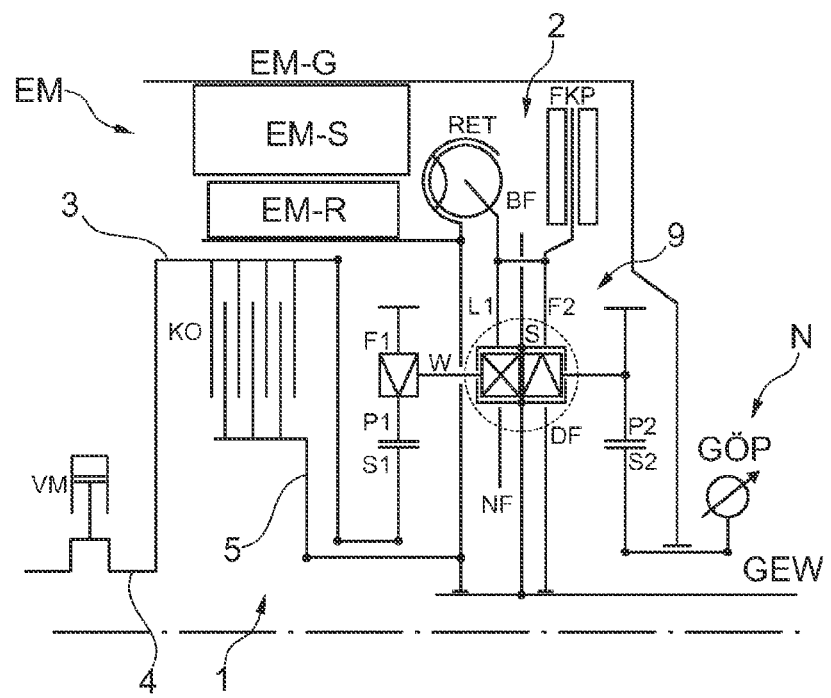
FIG. 2 is a schematic diagram of an upper half of a drivetrain according to another embodiment of the invention in a hybrid vehicle.

FIGS. 1 and 2 schematically show two embodiments of a drivetrain 1 according to the invention in a hybrid vehicle having an internal combustion engine VM and an electric machine EM. The electric machine EM has a rotor EM-R and a stator EM-S, the latter being connected to the housing EM-G. In both cases, the drivetrain 1 has a starting clutch K0 (wet or dry), a transmission G according to the invention, and a rotary vibration damper 2 for vibration isolation, which rotary vibration damper is arranged between the electric machine EM and the transmission input shaft GEW (of the traction gearbox) and also between an output flange NF of the starting clutch K0 and the transmission input shaft GEW. In the traction gearbox (not shown) there is arranged a transmission oil pump GÖP, the mechanical drive of which can be ensured in the different operating states of the hybrid vehicle by means of the transmission G according to the invention. The two exemplary embodiments of the drivetrains 1 according to the invention shown in FIGS. 1 and 2 basically differ merely by variants of the rotary vibration damper 2. In FIG. 1, for example, the rotary vibration damper 2 is a dual mass flywheel (ZMS) with compression springs DF, whereas the rotary vibration damper in FIG. 2 is a dual mass flywheel retainer damper RET with bow springs BF and centrifugal force pendulum FKP. Even though the following description of the invention relates primarily to the drivetrain 1 shown in FIG. 2, this description thus substantially also applies to the exemplary embodiment of FIG. 1.

Referring now to FIG. 2, the planetary gear set according to the invention is constructed as follows. On the drive input side of the transmission G, a first sun gear S1 is rotationally conjointly connected to an input part 3 of the starting clutch K0 (that is to say to the outer plate carrier) and thus to the crankshaft 4 of the internal combustion engine VM. The first sun gear S1 is in permanent engagement, by means of a corresponding toothing, with a first planet gear P1 which is connected via a freewheel F1 to a planet shaft W, specifically in such a way that the freewheel F1 generates a rotationally conjoint connection when the first planet gear P1 rotates in a first direction of rotation (blocking direction), and generates a freewheeling connection when the first planet gear P1 rotates in a second, opposite direction of rotation. On the drive output side of the transmission G, a second planet gear P2 is connected to the planet shaft W rigidly or rotationally conjointly in both directions (for example by being pressed on or welded) and is in engagement with a second sun gear S2 by means of a corresponding toothing. The second sun gear S2 has a direct connection to the auxiliary assembly N in the form of a transmission oil pump GÖP.

The primary side of the rotary vibration damper 2 (in this case an external damper, bow spring BF in the retainer RET) is connected both fixedly to the electric machine rotor (EM-Rotor) and also via a toothing to an output part 5 (that is to say the inner plate carrier) of the starting clutch K0. The torque is thus transmitted via the bow spring BF both from the electric machine EM and also from the internal combustion engine VM to the intermediate flange with centrifugal force pendulum FKP, and is transferred from there into the traction gearbox via the inner damper springs DF and the hub flange NF.

The hub flange NF in turn serves as a planet carrier or web S for the planetary gear set G, wherein it is also conceivable for both the input part of the damper 2 (in this case retainer) or the intermediate flange (in this case one of the two, or both, side disks) to be used as a web. Said planet carrier or web S is connected to the planet shaft W by means of a bearing L1 and, combined therewith, a freewheel F2, said connection being rotationally conjoint in a blocking direction of the freewheel F2.

Figure 3:
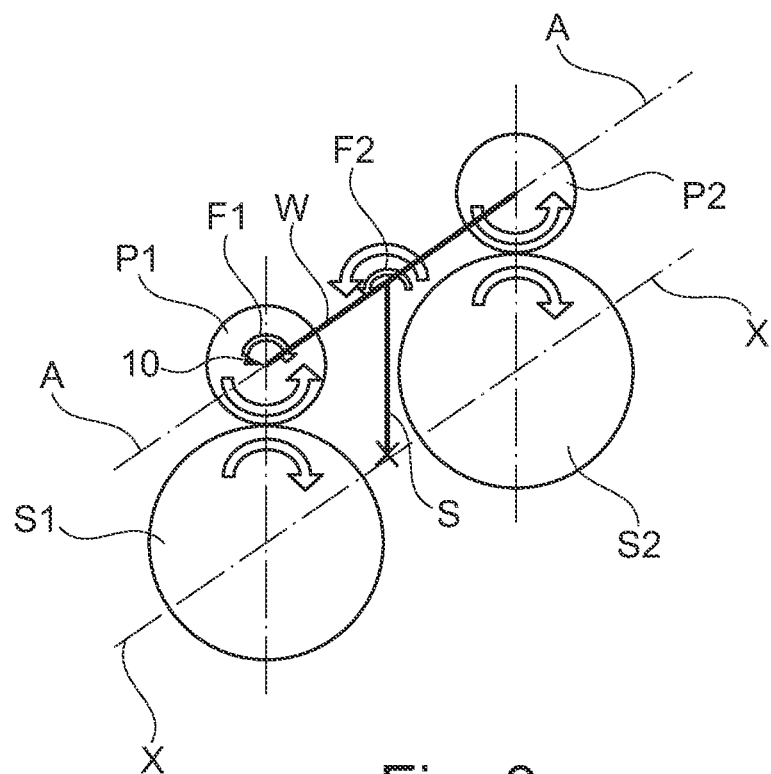
FIG. 3 is a schematic diagram of the transmission of the embodiment of FIG. 2, during purely internal-combustion-engine-powered operation and with the clutch open.

Referring to FIG. 3, said figure shows the components of the transmission G according to the invention, and the function thereof, during purely internal-combustion-engine-powered operation (VM operation) with the starting clutch K0 open. That is to say, the starting clutch K0 is open, the internal combustion engine VM is rotating, the electric machine EM (and the web S) is stationary, and the transmission ratio $i_0$ of the planetary gear set G is equal to 1 (that is to say $i_0=1$). In said operating state, the auxiliary assembly N or the oil pump GÖP is driven directly by means of the planet drive S1, P1, P2, S2 with the corresponding transmission ratio, wherein the freewheel F1 exerts a blocking action such that the torque is transmitted from the first planet gear P1 to the planet shaft W, and wherein the freewheel F2 releases the planet shaft W from the non-rotating (that is to say stationary) planet carrier or web S, such that the oil pump GÖP is driven by means of the second planet gear P2 and the second sun gear S2. The arrow 10 indicates that the freewheel F1 blocks the first planet gear P1 with respect to the shaft W, and the shaft W rotates.

Figure 4:
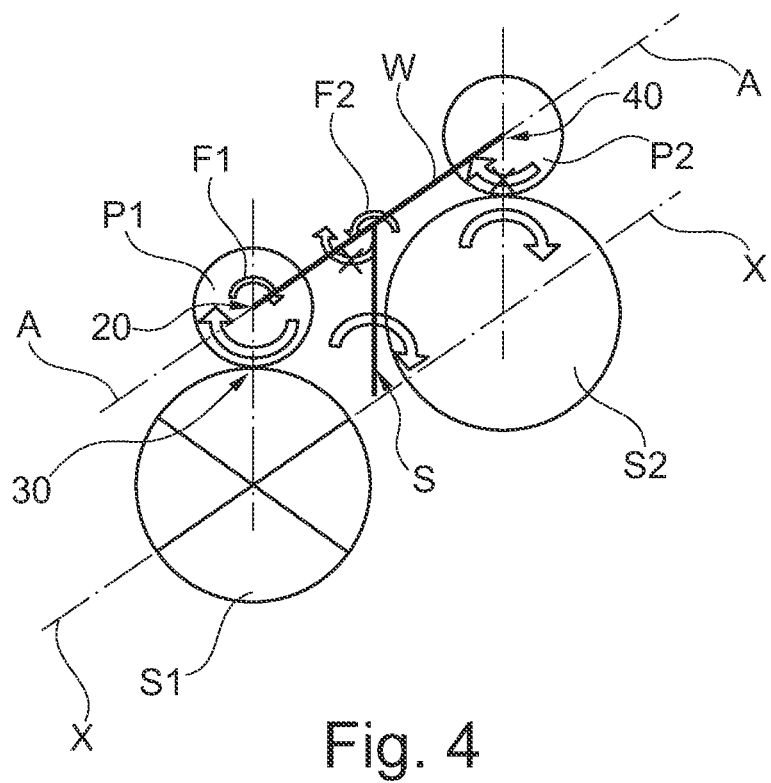
FIG. 4 is a schematic diagram of the transmission of the embodiment of FIG. 2, during purely electric-motor-powered operation and with the clutch open.

FIG. 4 shows the components S1, P1, P2, S2 of the transmission G according to the invention, and the function thereof, during purely electric-machine-powered operation (EM operation) and with the starting clutch K0 open. That is to say, the starting clutch K0 is open, the internal combustion engine VM is stationary, the electric machine EM (and the web S) is rotating, and $i_0=1$. In said operating state, the auxiliary assembly N or the oil pump GÖP is driven by means of the damper spring and the hub flange NF (that is to say the web S). Here, the first freewheel F1 releases the first planet gear P1 from the shaft W, such that the first planet gear P1 can roll on the first sun gear S1 without transmitting torque to the internal combustion engine VM. The arrow 20 indicates the release of the first planet gear P1 from the shaft W by the freewheel F1, such that the first planet gear P1 rotates relative to the shaft W (freewheel free), whereas the arrow 30 indicates the rolling of the planet gear P1 on the sun gear S1. By contrast, the freewheel F2 blocks the planet shaft W with respect to the planet carrier (that is to say the web S), as indicated by the arrow 40, such that the shaft W and the second planet gear P2 do not rotate about the planet axis A. Rather, the planet carrier (that is to say the web S) is rotated about the main axis X, and the second sun gear S2 is driven by the circulating second planet gear P2, such that the oil pump GÖP is again driven at the rotational speed of the electric motor EM.

Figure 5:
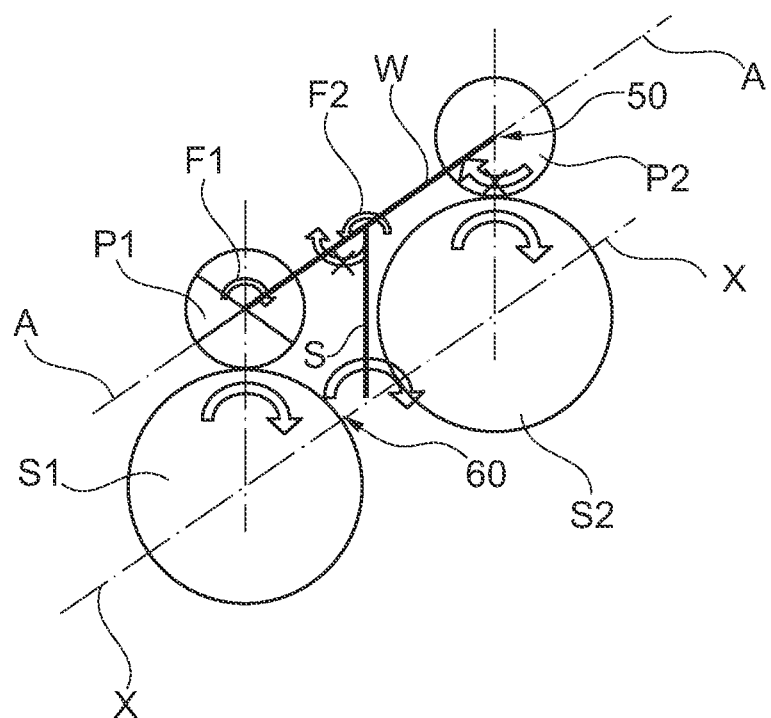
FIG. 5 is a schematic diagram of the transmission of the embodiment of FIG. 2, during combined internal-combustion-engine-powered and electric-motor-powered operation and with the clutch closed.

FIG. 5 shows the components S1, P1, P2, S2 of the transmission G according to the invention, and the function thereof, when the starting clutch K0 is closed. That is to say, the starting clutch K0 is closed, the internal combustion engine VM is rotating, the electric machine EM (and the web S) is rotating, and $i_0=1$. When the clutch K0 is closed, the electric machine EM and the internal combustion engine VM are fixedly connected to one another. The arrow 50 indicates that the second freewheel F2 blocks the shaft W in its bearing L1, such that neither the shaft W nor the second planet gear P2 rotate about the planet axis A. Rather, as indicated by the arrow 60, the drive VM+EM and the planet carrier (that is to say the web S) rotate at the same rotational speed—connected via the clutch K0. The two sun gears S1 and S2 and the web S thus rotate as a compact unit, such that the oil pump GÖP is again driven at the rotational speed of the engine.

Figure 6:
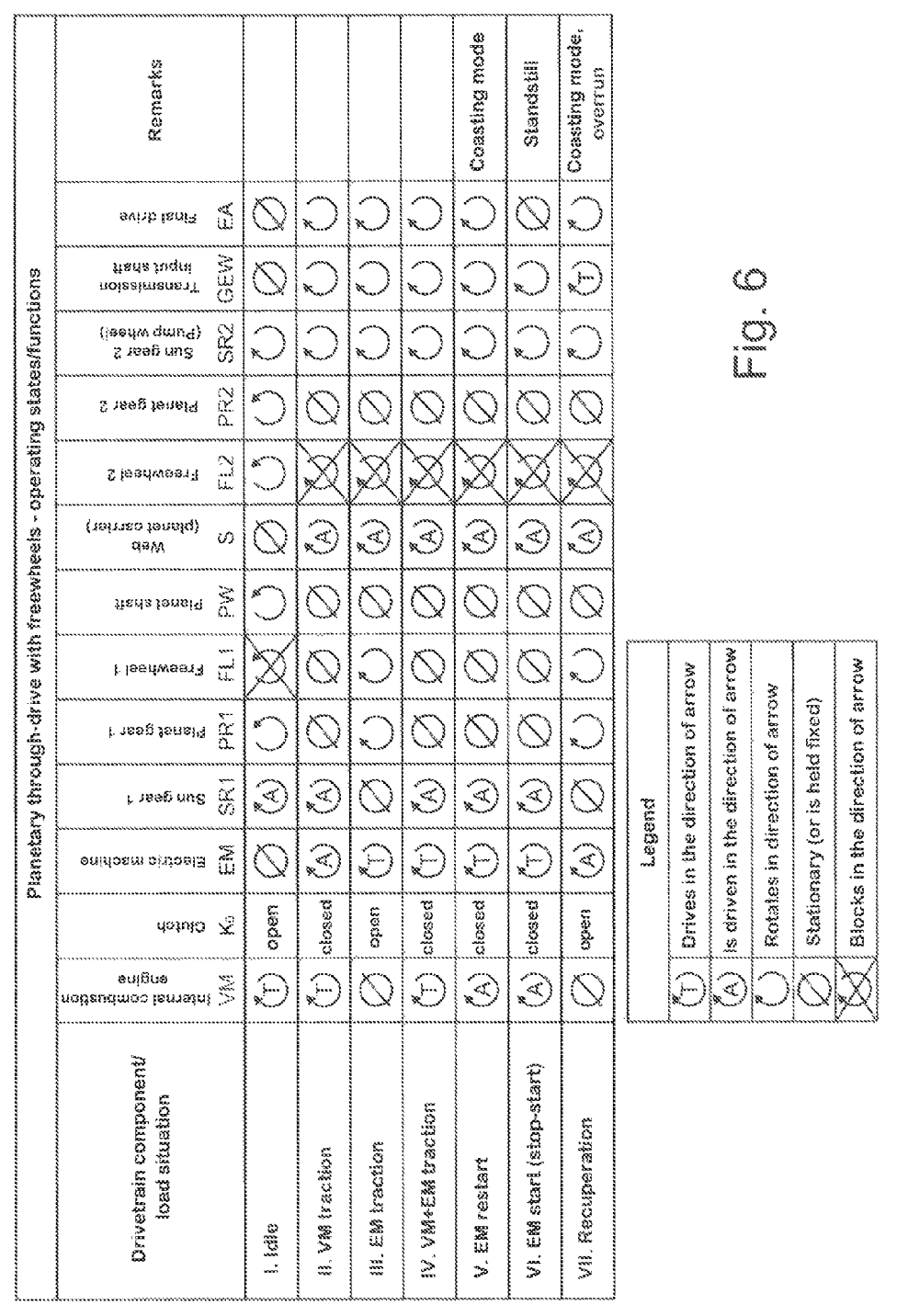

FIG. 6 shows a table in which the diverse operating states of the hybrid vehicle are labeled with Roman numerals from I to VII in the left-hand column. The columns to the right identify the individual components of the drivetrain 1 and the behavior thereof in the respective operating states. The abbreviations in said table deviate slightly from the other figures, in that in this case the first sun gear is denoted SR1, the first planet gear is denoted PR1, the first freewheel is denoted FL1, the planet shaft is denoted PW, the first freewheel is denoted FL2, the second planet gear is denoted PR2, and the second sun gear is denoted SR2.

The operating states I, III and IV—that is to say "idle", "EM traction" and "VM+EM traction"—in the table of FIG. 6 correspond in each case to the operating states of the vehicle shown in FIGS. 3, 4 and 5. The operating state II "VM traction" yields substantially the same effect as the operating state IV "VM+EM traction" of FIG. 5, with the single difference that, in the operating state II, the electric machine EM is merely driven by the internal combustion engine VM, and does not itself provide drive. The operating state V "EM restart" is the so-called "coasting mode" or overrun mode in which the electric machine EM is reactivated by means of a closed starting clutch K0. The effect is the same as in the operating state II "VM traction", with the exception that it is now the electric motor EM that is driving and the internal combustion engine VM that is being driven, not vice versa. A similar situation applies to the operating state VI "EM start", with the exception that the final drive EA is stationary.

The transmission G according to the invention, and thus the drivetrain 1, can have multiple advantages; inter alia (i) a mechanical auxiliary assembly drive is provided in diverse operating states of the hybrid vehicle, (ii) a transmission ratio≠1 is possible in the planetary drive, (iii) more radial installation space, because there is no longer a transmission of torque via the "casing", and (iv) no additional electric pump is required.

LIST OF REFERENCE SYMBOLS

1 Drivetrain
2 Rotary vibration damper
3 Input part of the starting clutch
4 Crankshaft
5 Output part of the starting clutch
EM Electric machine
EM-S Electric stator
EM-R Electric rotor
VM Internal combustion engine
K0 Starting clutch
DF Compression spring
BF Bow spring
FKP Centrifugal force pendulum
RET Retainer damper
G Planetary gear set
W Planet shaft or web shaft
S Planet carrier or web
S1 First sun gear (drive input)
S2 Second sun gear (drive output)
P1 First planet gear (drive input)
P2 Second planet gear (drive output)
F1 First freewheel (P1-W)
F2 Second freewheel (W-S)
L1 Rotary bearing (W-S)
NF Drive output flange or hub flange
N Auxiliary assembly
GÖP Transmission oil pump
GEW Transmission input shaft
X Main axis of rotation
A Planet axis

The invention claimed is:

1. A transmission for operating an auxiliary assembly in a drivetrain of a vehicle, comprising:
    a first sun gear or internal gear rotatable about a main axis on a drive input side of the transmission,
    a first planet gear in engagement with the first sun gear or internal gear on the drive input side of the transmission,
    a second planet gear or internal gear on a drive output side of the transmission and mounted with the first planet gear or internal gear on a common shaft, and
    a second sun gear or internal gear in engagement with the second planet gear on the drive output side of the transmission, for coupling to the auxiliary assembly,
    a first freewheel connecting the first planet gear to the common shaft, the first freewheel generating a rotationally conjoint connection between the first planet gear and the common shaft when the first planet gear overruns the common shaft in a first direction of rotation about an axis of the common shaft, and the first freewheel generating a freewheeling connection between the planet gear and the common shaft when the first planet gear overruns the common shaft in a second, opposite direction of rotation, wherein the second planet gear is connected to the common shaft rotationally conjointly in both directions of rotation, and
    a planet carrier mounted on the common shaft by a second freewheel that permits a rotation of the common shaft relative to the planet carrier when the common shaft rotates about the axis of the common shaft in the first direction of rotation and blocks a rotation of the common shaft relative to the planet carrier in the second, opposite direction of rotation.

2. The transmission according to claim 1, wherein the planet carrier is rotatable about the main axis, and the planet carrier is designed for rotationally conjoint connection to an output part of a starting clutch.

3. The transmission according to claim 2, wherein the first sun gear or internal gear is designed for rotationally conjoint connection to an input part of the starting clutch.

4. The transmission according to claim 3, wherein the transmission is configured for a hybrid vehicle, the planet carrier is designed for rotationally conjoint connection to a rotor of an electric machine, and the first sun gear or internal gear is designed for rotationally conjoint connection to a crankshaft.

5. The transmission according to claim 1, wherein the common shaft on which the first and second planet gears are mounted extends substantially parallel to the main axis of rotation.

6. The transmission according to claim 1, wherein a transmission ratio of the transmission from the first sun gear or internal gear to the second sun gear or internal gear is equal to 1.

7. The transmission according to claim 1, wherein the second sun gear or internal gear is mounted so as to rotate about an axis which is collinear with the main axis.

8. The transmission according to claim 1, having
    a plurality of first planet gears in engagement with the first sun gear or internal gear, and uniformly distributed about the circumference thereof, on the drive input side of the transmission, and a plurality of second planet gears in engagement with the second sun gear or ingernal gear, and uniformly distributed about the circumference thereof, on the drive output side of the transmission, wherein in each case one first planet gear and in each case one second planet gear are mounted on in each case one common shaft.

9. The transmission according to claim 1, wherein at least one of the first sun gear or internal gear and the second sun gear or internal gear is an internal gear.

10. The transmission according to claim 1, wherein at least one of the first sun gear or internal gear and the second sun gear or internal gear is a sun gear.

11. A powertrain for operating an auxiliary assembly in a drivetrain of a vehicle, comprising
- a transmission according to claim 1, and
- a rotary vibration damper, wherein the rotary vibration damper has a primary mass which is rotatable about the main axis of rotation, a secondary mass which is rotatable in the circumferential direction relative to the primary mass about the main axis of rotation, and an energy store device by means of which the secondary mass is coupled to the primary mass in such a way that relative rotation is permitted to a limited extent, wherein the common shaft on which the first and second planet gears are mounted extends through a through-drive opening in the rotary vibration damper from the primary mass to the secondary mass.

12. The powertrain according to claim 11, wherein the through-drive opening in the rotary vibration damper permits a maximum relative rotation of the secondary mass with respect to the primary mass about the main axis of rotation, without the common shaft abutting against an edge or against a circumference of the through-drive opening.

13. The powertrain according to claim 11, wherein the energy store device has at least one spring, and wherein the common shaft is arranged at the same effective radius as, or at a similar effective radius to, the at least one spring of the rotary vibration damper.

14. A drivetrain of a hybrid vehicle, having an internal combustion engine, an electric machine and a starting dutch, the drive train comprising:
- a transmission according to claim 1 for operating an auxiliary assembly,
- wherein the first sun gear or internal gear is rotationally conjointly connected to an input part of the starting dutch, which is connected with a crankshaft of the internal combustion engine, and
- wherein the common shaft, on which the first and second planet gears are mounted, is mounted in the planet carrier, the planet carrier being rotatable about the main axis and rotationally conjointly connected to an output part of the starting clutch, which is connected to a rotor of the electric machine.

* * * * *